(12) United States Patent
Lee et al.

(10) Patent No.: US 12,049,013 B1
(45) Date of Patent: Jul. 30, 2024

(54) METHOD FOR PREVENTING COLLISION BETWEEN TASK-PERFORMING ROBOTS

(71) Applicant: MakinaRocks Co., Ltd., Seoul (KR)

(72) Inventors: Jeyeol Lee, Seoul (KR); Goncalves Rocha Yuri, Seoul (KR); Yu Jeong Jeong, Seoul (KR)

(73) Assignee: MakinaRocks Co., Ltd., Seoul (KR)

( * ) Notice: Subject to any disclaimer, the term of this patent is extended or adjusted under 35 U.S.C. 154(b) by 0 days.

(21) Appl. No.: 18/424,768

(22) Filed: Jan. 27, 2024

(30) Foreign Application Priority Data

Jan. 30, 2023 (KR) .................. 10-2023-0011506
Aug. 29, 2023 (KR) .................. 10-2023-0113727

(51) Int. Cl.
| | | |
|---|---|---|
| *B25J 9/16* | (2006.01) | |
| *B25J 9/00* | (2006.01) | |
| *B25J 13/08* | (2006.01) | |

(52) U.S. Cl.
CPC .......... *B25J 9/1666* (2013.01); *B25J 9/0084* (2013.01); *B25J 9/1671* (2013.01); *B25J 13/089* (2013.01)

(58) Field of Classification Search
CPC ...... B25J 9/0084; B25J 9/1666; B25J 9/1671; B25J 13/089; G05B 2219/39099
See application file for complete search history.

(56) References Cited

U.S. PATENT DOCUMENTS

| | | | |
|---|---|---|---|
| 11,179,850 B2 | 11/2021 | Dupuis et al. | |
| 2007/0150093 A1* | 6/2007 | Nagatsuka | B25J 9/1682 700/235 |
| 2018/0178379 A1* | 6/2018 | Takeda | B25J 9/1671 |

FOREIGN PATENT DOCUMENTS

| | | | |
|---|---|---|---|
| CN | 114144285 A | | 3/2022 |
| EP | 3266570 A1 | | 1/2018 |
| EP | 3900887 A1 | | 10/2021 |
| JP | 08-036409 A | | 2/1996 |
| JP | 2016190315 A | * | 11/2016 |
| JP | 2018-020413 A | | 2/2018 |
| JP | 2019136848 A | * | 8/2019 |
| KR | 10-2004-0064106 A | | 7/2004 |
| KR | 10-2020-0126537 B1 | | 11/2020 |
| KR | 10-2190102 B1 | | 12/2020 |
| WO | 2020/219734 A1 | | 10/2020 |

* cited by examiner

*Primary Examiner* — Dale Moyer
(74) *Attorney, Agent, or Firm* — Dennemeyer & Associates LLC

(57) ABSTRACT

Disclosed is a method for preventing a collision between a plurality of task-performing robots, the method performed by one or more processors of a computing device. The method may include: determining available work points for each of the plurality of task-performing robots; distributing target work points for each of the plurality of task-performing robots based on the determined available work points, and predicting a plurality of target work trajectories for each of the plurality of task-performing robots based on the distributed target work points; predicting work areas for each of the plurality of task-performing robots based on the predicted plurality of target work trajectories; calculating an area where two or more work areas among the predicted work areas for each of the plurality of task-performing robots cross, and setting a collision risk area based on the crossing area; and determining work orders or work trajectories of the plurality of task-performing robots based on the set collision risk area.

9 Claims, 7 Drawing Sheets

Fig.4
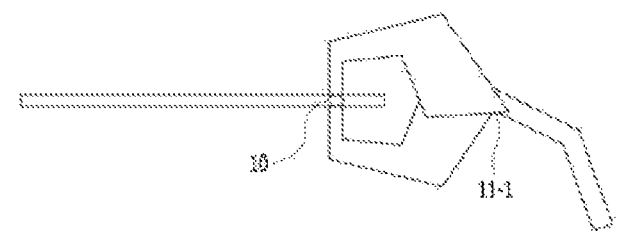
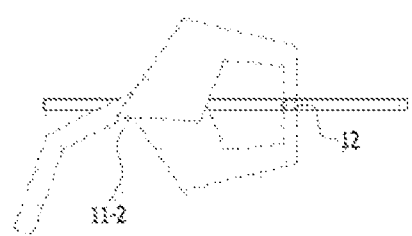
Fig.5
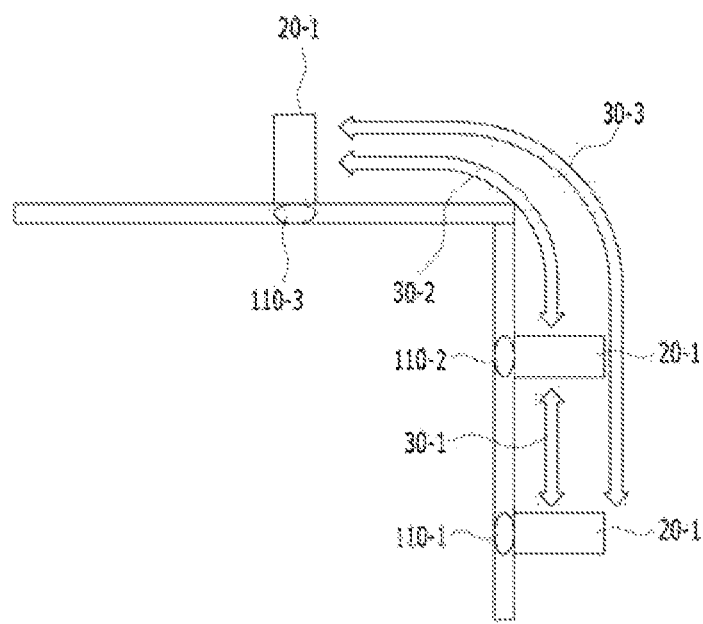

METHOD FOR PREVENTING COLLISION BETWEEN TASK-PERFORMING ROBOTS

CROSS-REFERENCE TO RELATED APPLICATIONS

This application claims priority to and the benefit of Korean Patent Application No. 10-2023-0011506 filed in the Korean Intellectual Property Office on Jan. 30, 2023, the entire contents of which are incorporated herein by reference.

TECHNICAL FIELD

The present disclosure relates to a method for preventing a collision between a plurality of task-performing robots, and more particularly, to a method for preventing a collision between a plurality of task-performing robots when there is a situation in which a work area is shared between robots.

BACKGROUND ART

When work trajectories of each of task-performing robots within a work station are given, a situation may occur in which each of the work trajectories share the same work area. In this case, collisions between robots may occur, so the work areas between robots should not overlap as much as possible. However, in some cases, it may be impossible to generate a trajectory that avoids all of the collisions. Therefore, in the field, the problem is solved using interlock signals between robots. If a collision between robots is expected, when one of the two robots enters the work area first, the other robot receives a signal and stops, and when the robot that worked first leaves the work area, the other robot may receive the signal and resume work. However, currently, the user directly manually generates the interlock signals by expecting whether the robots collide, and a generation-test process is repeated until the collision does not occur. Not only is this method inefficient in terms of time, but there is a problem that even if a collision does not occur in the end, additional waiting time may exceed the time allocated to each work station. Accordingly, there is an emerging need for a method to automatically generate such interlock signals to prevent collisions between a plurality of task-performing robots.

On the other hand, the present disclosure has been derived at least based on the technical background described above, but the technical problem or object of the present disclosure is not limited to solving the problems or disadvantages described above. That is, the present disclosure may cover various technical issues related to the content to be described below, in addition to the technical issues discussed above.

SUMMARY OF THE INVENTION

The present disclosure has been made in an effort to prevent a collision between a plurality of task-performing robots when there is a situation in which a work area is shared between robots.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method performed by a computing device. The method may include: determining available work points for each of a plurality of task-performing robots; distributing target work points for each of the plurality of task-performing robots based on the determined available work points, and predicting a plurality of target work trajectories for each of the plurality of task-performing robots based on the distributed target work points; predicting work areas for each of the plurality of task-performing robots based on the predicted plurality of target work trajectories; calculating an area where two or more work areas among the predicted work areas for each of the plurality of task-performing robots cross, and setting a collision risk area based on the crossing area; and determining work orders or work trajectories of the plurality of task-performing robots based on the set collision risk area.

Alternatively, the determining of the available work points for each of the plurality of task-performing robots may include determining the available work points based on at least one of a posture, a position, or an entry of each of the plurality of task-performing robots.

Alternatively, the target work points may mean points at which each of the plurality of task-performing robots actually perform work among the determined available work points.

Alternatively, the predicting of the plurality of target work trajectories for each of the plurality of task-performing robots based on the distributed target work points may include predicting shortest distance target work trajectories passing through all target work points distributed to each of the plurality of task-performing robots.

Alternatively, the predicting of the work areas for each of the plurality of task-performing robots based on the predicted plurality of target work trajectories may include moving each of the plurality of task-performing robots based on the predicted plurality of target work trajectories, expressing a space occupied while moving by each of the plurality of task-performing robots as volume information, and predicting the volume information expressed for each of the plurality of task-performing robots as the work areas for each of the plurality of task-performing robots.

Alternatively, the calculating of the area where two or more work areas among the predicted work areas for each of the plurality of task-performing robots cross, and setting of the collision risk area based on the crossing area may include calculating an area where volume information of two or more task-performing robots crosses among volume information expressed for each of the plurality of task-performing robots, and setting the calculated area where the volume information of two or more task-performing robots crosses as the collision risk area.

Alternatively, the determining of the work orders or work trajectories of the plurality of task-performing robots based on the set collision risk area may include generating an interlock signal when one of the plurality of task-performing robots is present in the set collision risk area, and determining the work orders or work trajectories of the plurality of task-performing robots by considering the generated interlock signal.

Alternatively, the determining of the work orders or work trajectories of the plurality of task-performing robots by considering the generated interlock signal may include determining the work orders to prevent other task-performing robots including the collision risk area in which the interlock signal is generated among the plurality of task-performing robots from entering the collision risk area by considering the interlock signal.

Alternatively, the determining of the work orders or work trajectories of the plurality of task-performing robots by considering the generated interlock signal may include changing a progress direction of a target work trajectories of at least one of the plurality of task-performing robots to an opposite direction; performing a simulation for the plurality of task-performing robots based on the predicted plurality of target work trajectories or the changed target work trajectory, and estimating an influence of the interlock signal for the simulation, and determining the work trajectories of the plurality of task-performing robots based on the estimated influence of the interlock signal.

Another exemplary embodiment of the present disclosure provides a computer program stored in a computer-readable storage medium. When the computer program is executed by one or more processors, the computer program may allow the one or more processors to perform operations for preventing a collision between a plurality of task-performing robots, and the operations may include: an operation of determining available work points for each of the plurality of task-performing robots; an operation of distributing target work points for each of the plurality of task-performing robots based on the determined available work points, and predicting a plurality of target work trajectories for each of the plurality of task-performing robots based on the distributed target work points; an operation of predicting work areas for each of the plurality of task-performing robots based on the predicted plurality of target work trajectories; an operation of calculating an area where two or more work areas among the predicted work areas for each of the plurality of task-performing robots cross, and setting a collision risk area based on the crossing area; and an operation of determining work orders or work trajectories of the plurality of task-performing robots based on the set collision risk area.

Still another exemplary embodiment of the present disclosure provides a computing device. The computing device may include: at least one processor; and a memory, and the processor may be configured to determine available work points for each of a plurality of task-performing robots, distribute target work points for each of the plurality of task-performing robots based on the determined available work points, and predict a plurality of target work trajectories for each of the plurality of task-performing robots based on the distributed target work points, predict work areas for each of the plurality of task-performing robots based on the predicted plurality of target work trajectories, calculate an area where two or more work areas among the predicted work areas for each of the plurality of task-performing robots cross, and set a collision risk area based on the crossing area, and determine work orders or work trajectories of the plurality of task-performing robots based on the set collision risk area.

According to an exemplary embodiment of the present disclosure, a collision between the plurality of task-performing robots can be prevented when there is a situation in which a work area is shared between robots.

Meanwhile, the effects of the present disclosure are not limited to the above-mentioned effects, and various effects can be included within the scope which is apparent to those skilled in the art from contents to be described below.

BRIEF DESCRIPTION OF THE DRAWINGS

FIG. 4 is a schematic view for describing a process of determining available work points for each of a plurality of task-performing robots according to an exemplary embodiment of the present disclosure.

FIG. 5 is a schematic view illustrating a process of predicting shortest distance target work trajectories passing through all target work points distributed to each of the plurality of task-performing robots according to the exemplary embodiment of the present disclosure.

DETAILED DESCRIPTION

Figure 1:
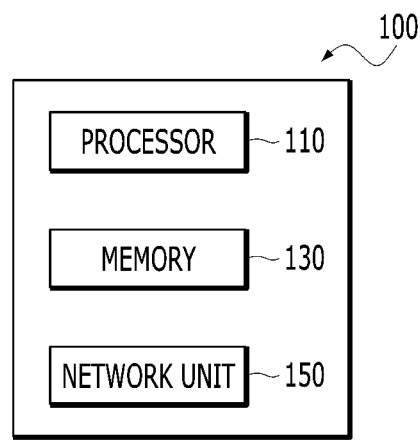
FIG. 1 is a block diagram of a computing device for preventing a collision between a plurality of task-performing robots according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components.

One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally In terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for preventing a collision between a plurality of task-performing robots according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for training the neural network. At least one of the CPU, GPGPU, and TPU of the processor 110 may process training of a network function. For example, both the CPU and the GPGPU may process the training of the network function and data classification using the network function. Further, in an exemplary embodiment of the present disclosure, processors of a plurality ofty of computing devices may be used together to process the training of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network unit 150 presented in the present disclosure may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In the present disclosure, the network unit 150 may be configured regardless of communication modes such as wired and wireless modes and constituted by various communication networks including a personal area network (PAN), a wide area network (WAN), and the like. Further, the network may be known World Wide Web (WWW) and may adopt a wireless transmission technology used for short-distance communication, such as infrared data association (IrDA) or Bluetooth. The techniques described in the present disclosure may also be used in other networks mentioned above.

Figure 2:
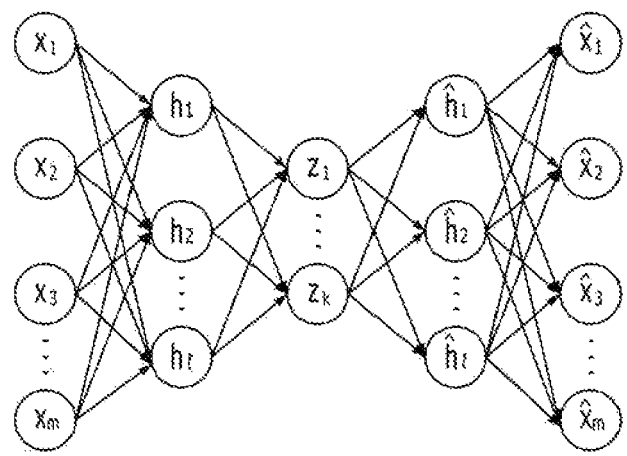
FIG. 2 is a schematic view illustrating a network function according to an exemplary embodiment of the present disclosure.

FIG. 2 is a conceptual view illustrating a neural network according to an exemplary embodiment of the present disclosure.

A neural network model according to the exemplary embodiment of the present disclosure may include a neural network for evaluating placement of the semiconductor device. Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality ofity of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be trained in at least one scheme of supervised learning, unsupervised learning, semi supervised learning, or reinforcement learning. The learning of the neural network may be a process in which the neural network applies knowledge for performing a specific operation to the neural network.

The neural network may be trained in a direction to minimize errors of an output. The training of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a training cycle (epoch). The learning rate may be applied differently according to the number of repetition times of the training cycle of the neural network. For example, in an initial stage of the training of the neural network, the neural network ensures a certain level of performance quickly by using a high learning rate, thereby increasing efficiency and uses a low learning rate in a latter stage of the training, thereby increasing accuracy.

In training of the neural network, the training data may be generally a subset of actual data (i.e., data to be processed using the trained neural network), and as a result, there may be a training cycle in which errors for the training data decrease, but the errors for the actual data increase. Overfitting is a phenomenon in which the errors for the actual data increase due to excessive training of the training data. For example, a phenomenon in which the neural network that trains a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of training, utilization of a batch normalization layer, etc., may be applied.

Figure 3:
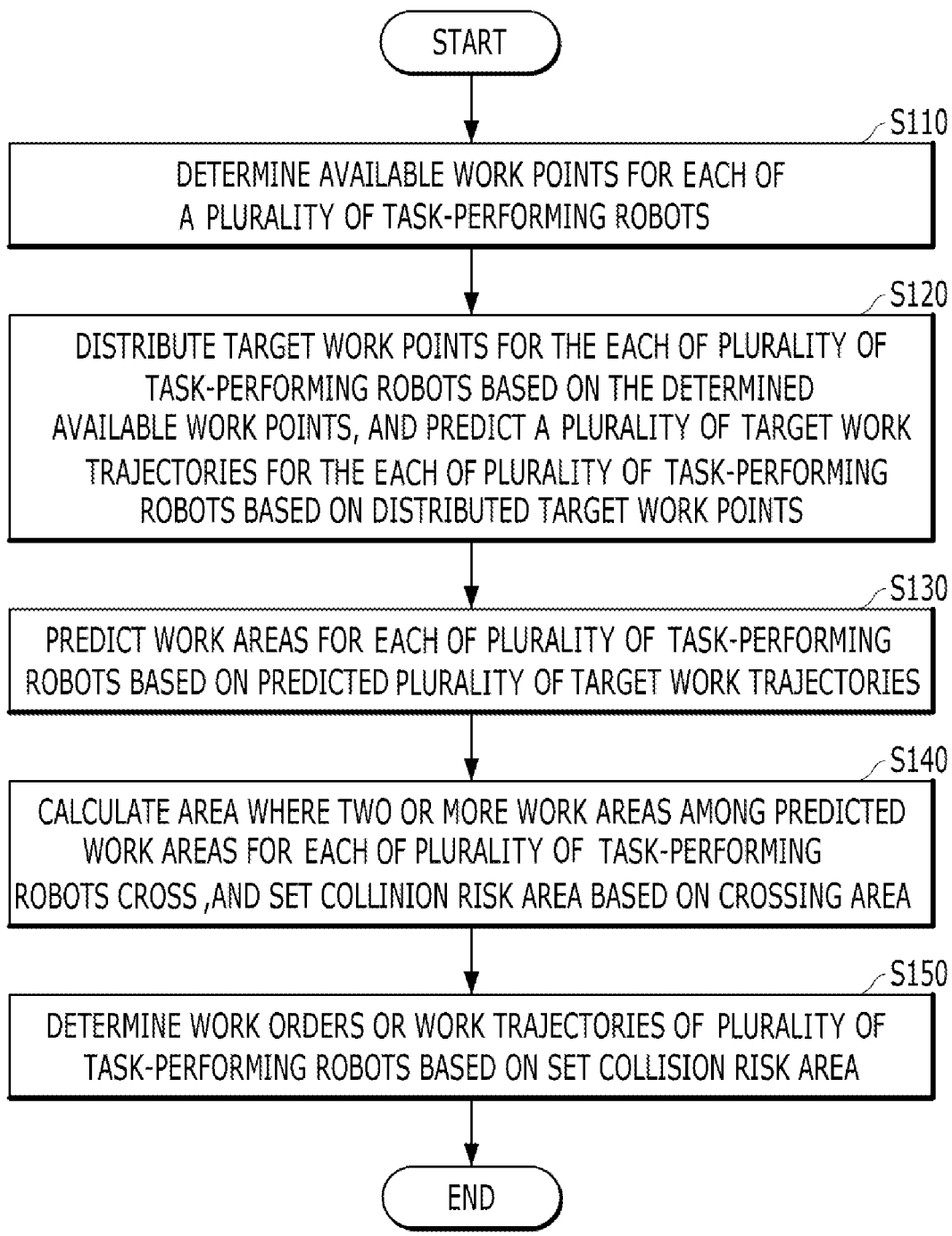
FIG. 3 is a flowchart illustrating a method for preventing a collision between a plurality of task-performing robots according to an exemplary embodiment of the present disclosure.

FIG. 3 is a flowchart illustrating a method for preventing a collision between a plurality of task-performing robots according to an exemplary embodiment of the present disclosure.

A computing device 100 according to an exemplary embodiment of the present disclosure may directly acquire or receive, from an external system, "work information for preventing a collision between a plurality of task-performing robots". The external system may be a server or database that stores and manages the work information for preventing the collision between the plurality of task-performing robots. The computing device 100 may use the work information acquired directly or received from the external system as "input data for preventing the collision between the plurality of task-performing robots".

The computing device 100 may determine available work points for each of the plurality of task-performing robots (S110). For example, the computing device 100 may determine the available work points based on at least one of a posture, a position, or entry of each of the plurality of task-performing robots. Specifically, the computing device 100 may determine available work points at which a specific task-performing robot among the plurality of task-performing robots is capable of performing work based on at least one of the posture, the position, or the entry of each of the plurality of task-performing robots among the work points, and store the specific task-performing robot and the available work points as a data pair. A detailed description thereof will be described below with reference to FIG. 4 below.

The computing device 100 may distribute target work points for each of the plurality of task-performing robots based on the available work points determined through step S110, and predict a plurality of target work trajectories for each of the plurality of task-performing robots based on the distributed target work points (S120). In this case, the target work points may mean points at which each of the plurality of task-performing robots actually perform the work among the available work points determined through step S110.

According to an exemplary embodiment of the present disclosure, the computing device 100 may predict shortest distance target work trajectories passing through all target work points distributed to each of the plurality of task-performing robots. For example, when the target work points are distributed to each of the plurality of task-performing robots, in which order the work should be performed for the target work point should be determined, and this belongs to a traveling salesman problem (TSP) which is a problem of finding an order to visit all target work points at a shortest distance. Further, the computing device 100 should know a distance between the target work points in order to determine a visitation order for the target work point by using a TSP solver which is already present as a known technology in order to solve the traveling salesman problem (TSP). Meanwhile, the computing device 100 generates a plurality of candidate work trajectories for each of the plurality of task-performing robots by considering whether Cartesian move is possible, obstacle information, whether an interpolated trajectory can be generated, whether the work trajectory needs to be modified, etc., for two arbitrary points among the available work points for each of the plurality of task-performing robots, and predicts a distance between the generated plurality of candidate work trajectories to predict "the distance between two arbitrary points among the available work points". In this case, in the case of the Cartesian move, the task-performing robot may move in front/rear, up/down, and left/right directions with respect to two arbitrary points among the determined available work points, and the Cartesian move may mean a movement in which the task-performing robot moves within three motion axes of x, y, and z, and the interpolated trajectory may mean a trajectory in which the obstacle information is disregarded for two arbitrary points among the determined available work points, and a rotating operation and a joint limit of the task-performing robot are considered, and in the interpolated trajectory, since the rotating operation and the joint limit of the task-performing robot may be considered, when "a distance of a trajectory between two available work points which are close to each other or spaced apart from each other by an intermediate distance" is predicted, the distance of the trajectory between two available work points may be predicted more accurately than a Euclidean distance. Further, the distance between the target work points may be predicted based on "a prediction result of the distance between two arbitrary points among the available work points". Accordingly, the computing device 100 may predict a distance between the target work points distributed to each of the plurality of task-performing robots, easily determine the visitation order between the distributed target work points by using the TSP solver which is already present based on the predicted distance, and predict the shortest-distance target work trajectories passing through all of the target work points distributed to each of the plurality of task-performing robots based on the determined visitation order. A detailed description of the process of predicting the shortest-distance target work trajectories passing through all of the target work points distributed to each of the plurality of task-performing robots will be described below with reference to FIG. 5 below.

The computing device 100 may predict work areas for each of the plurality of task-performing robots based on the plurality of target work trajectories predicted through step S120 (S130). Specifically, the computing device 100 may move each of the plurality of task-performing robots based on the predicted plurality of target work trajectories on a 3D space expressed as voxel, express a space occupied while moving by each of the plurality of task-performing robots as volume information, and predict the volume information expressed for each of the plurality of task-performing robots as the work areas for each of the plurality of task-performing robots. A detailed description thereof will be described below with reference to FIG. 6 below.

The computing device 100 may calculate an area where two or more work areas among the work areas for each of the plurality of task-performing robots predicted through step S130 cross, and set a collision risk area based on the crossing area (S140). For example, when target work trajectories are given for each of the plurality of task-performing robots within the same work station, a situation may occur where each of the target work trajectories share the same work area, and in this case, since collisions between robots may occur, the computing device 100 may calculate an area where two or more work areas cross among the predicted work areas for each of the plurality of task-performing robots, and set the crossing area as the collision risk area. Specifically, the computing device 100 may calculate an area where volume information of two or more task-performing robots crosses among volume information expressed for each of the plurality of task-performing robots, and set the calculated area where the volume information of two or more task-performing robots crosses as the collision risk area. A specific process thereof will be described below with reference to FIG. 6 below. The set collision risk area may be used to determine the work order or work trajectory of the plurality of task-performing robots, and a specific process thereof will be described below with reference to FIGS. 7 to 8B below.

The computing device 100 may determine work orders or work trajectories of plurality of task-performing robots based on the collision risk area set through step S140 (S150). For example, the computing device 100 may generate an interlock signal when there is one of the plurality of task-performing robots in the set collision risk area, and determine the work orders or work trajectories of the plurality of task-performing robots by considering the generated interlock signal. Specifically, the computing device 100 may determine the work orders to prevent other task-performing robots including the collision risk area in which the interlock signal is generated among the plurality of task-performing robots from entering the collision risk area by considering the interlock signal. Further, the computing device 100 may change a progress direction of a target work trajectory of at least one of the plurality of task-performing robots to an opposite direction, perform a simulation for the plurality of task-performing robots based on the predicted plurality of target work trajectories or the changed target work trajectory, estimate an influence of the interlock signal for the simulation, and determine the work trajectories of the plurality of task-performing robots based on the estimated influence of the interlock signal. A specific process thereof will be described below through FIGS. 7 to 8B below.

FIG. 4 is a schematic view for describing a process of determining available work points for each of plurality of task-performing robots according to an exemplary embodiment of the present disclosure.

The computing device 100 may determine available work points 10 at which working is possible based on at least one of the posture, the position, or the entry of each of the plurality of task-performing robots among the work points, and store a specific task-performing robot and "available work points of the specific task-performing robot" as a data pair. For example, the task-performing robot may include a robot that performs welding, and work points may include welding points. In this case, referring to FIG. 4, when the work point is a position of a first welding point 10, the task-performing robot is capable of entering up to the first welding point 10 at a workable posture 11-1, and may be present at a position at which the working is possible with respect to the first welding point 10, so the first welding point 10 may be determined as the available work point. On the contrary, when the work point is a position of a second welding point 12, there is no posture of the task-performing robot capable of performing the work (11-2), the task-performing robot is incapable of entering up to the second welding point 12, and there is no position at which the working is possible with respect to the second welding point 12, so the second welding point 12 may be not determined as the available work point. Additionally, there may be a limit in length or rotation in a robot arm and a robot joint of the task-performing robot. Therefore, even when the welding points 10 and 12 are too distant from the task-performing robot, it is impossible to perform the work, so the welding points 10 and 12 may be not determined as the available work points.

Meanwhile, according to an exemplary embodiment of the present disclosure, the computing device 100 determines "available work points 10 at which each of the plurality of task-performing robots are capable of performing the work among the work points" based on at least one of the posture, the position, or the entry of each of the plurality of task-performing robots to reduce an input space and a search space when calculating the work trajectory of the task-performing robot. However, the welding points 10 and 12 are just an example for describing the available work points, which are not limited to the welding point, and points at which various works are performed may be included in the available work points. Meanwhile, a specific process of distributing the target points based on the available work points, and predicting the shortest-distance target work trajectories passing through all of the target work points distributed to each of the plurality of task-performing robots will be described below with reference to FIG. 5 below.

FIG. 5 is a schematic view illustrating a process of predicting shortest distance target work trajectories passing through all target work points distributed to each of the plurality of task-performing robots according to the exemplary embodiment of the present disclosure. In this case, the target work points may mean points at which each of the plurality of task-performing robots actually perform work among the determined available work points. Further, the computing device 100 may distribute the target work points to each of the plurality of task-performing robots so as to minimize cost or loss calculated by using a genetic algorithm or a neural network model. As a result, the target work points are distributed to each of the plurality of task-performing robots so as to minimize the calculated cost or loss, so each of the plurality of task-performing robots may move a small distance and visit all distributed task-performing points, and the task-performing points are prevented from being excessively distributed to a specific task-performing robot, and minimize a work area overlap between robots which belong to the same task-performing station to reduce a collision risk. However, various technologies may be used in the process of distributing the target work points to each of the plurality of task-performing robots in addition to the genetic algorithm, the neural network model, and the machine learning model.

Referring to FIG. 5, according to an exemplary embodiment of the present disclosure, the computing device 100 may predict shortest distance target work trajectories passing through all target work points 110-1, 110-2, and 110-3 distributed to each of the plurality of task-performing robots (20-1 in the example of FIG. 5). In this case, the target work point may mean a point at which the task-performing robot actually performs the work among the determined available work points. Meanwhile, when the target work points 110-1, 110-2, and 110-3 are distributed to each of the plurality of task-performing robots, in which order the work should be performed for the target work points 110-1, 110-2, and 110-3 should be determined, and this belongs to a traveling salesman problem (TSP) which is a problem of finding an order to visit all target work points at a shortest distance. Further, the computing device 100 should know a distance between the target work points in order to determine a visitation order for the target work points 110-1, 110-2, and 110-3 by using a TSP solver which is already present as a known technology. Meanwhile, the computing device 100 generates plurality of candidate work trajectories for each of the plurality of task-performing robots by considering whether Cartesian move is possible, obstacle information, whether an interpolated trajectory can be generated, whether the work trajectory needs to be modified, etc., for two arbitrary points among the available work points for each of the plurality of task-performing robots, and predicts a distance between the generated plurality of candidate work trajectories to predict "the distance between two arbitrary points among the available work points". In this case, in the case of the Cartesian move, the task-performing robot may move in front/rear, up/down, and left/right directions with respect to two arbitrary points among the determined available work points, and the Cartesian move may mean a movement in which the task-performing robot moves within three motion axes of x, y, and z, and the interpolated trajectory may mean a trajectory in which the obstacle information is disregarded for two arbitrary points among the determined available work points, and a rotating operation and a joint limit of the task-performing robot are considered, and in the interpolated trajectory, since the rotating operation and the joint limit of the task-performing robot may be considered, when "a distance of a trajectory between two available work points which are close to each other or spaced apart from each other by an intermediate distance" is predicted, the distance of the trajectory between two available work points may be predicted more accurately than a Euclidean distance.

Referring to FIG. 5, the distance between the target work points 110-1, 110-2, and 110-3 may be predicted based on "a prediction result of the distance between two arbitrary points among the available work points". Accordingly, the computing device 100 may predict a distance 30-1, 30-2, 30-3 between the target work points distributed to each of the plurality of task-performing robots, easily determine the visitation order between the distributed target work points 110-1, 110-2, and 110-3 by using the TSP solver which is already present based on the predicted distance 30-1, 30-2, and 30-3 between the target work points, and predict the shortest-distance target work trajectories passing through all of the target work points distributed to each of the plurality of task-performing robots based on the determined visitation order. Specifically, since the distance 30-1, 30-2, 30-3 between the target work points 110-1, 110-2, and 110-3 is predicted, the computing device 100 may find an order to visit all target work points at a shortest distance by using the TSP solver which is already present as known technology. In this case, since a sum of the distances 30-1 and 30-2 between the target work points 110-1, 110-2, and 110-3 is a shortest distance among combinations (in detail, a sum of two distances among the distance 30-1, the distance 30-2, or the distance 30-3) of the predicted distances, the visitation order between the target work points may be determined as an order of "first target work point 110-1→second target work point 110-2→third target work point 110-3" or "third target work point 110-3→second target work point 110-2→first target work point 110-1". Through this, the computing device 100 may predict shortest distance target work trajectories (a trajectory of working in the order of 110-1→110-2→110-3 and a trajectory of working in the order of 110-3→110-2→110-1) passing through all target work points 110-1, 110-2, and 110-3 distributed to each of the plurality of task-performing robots (20-1 in the example of FIG. 5). However, the target work points 110-1, 110-2, and 110-3 and the predicted distances 30-1, 30-2, and 30-3 which are examples are just examples, and are not limited thereto. Meanwhile, a specific process of predicting work areas for each of a plurality of task-performing robots based on predicted plurality of target work trajectories, calculating an area where two or more work areas cross among the predicted work areas for each of the plurality of task-performing robots, and setting a collision risk area based on the crossing area will be described below through FIG. 6 below.

Figure 6:
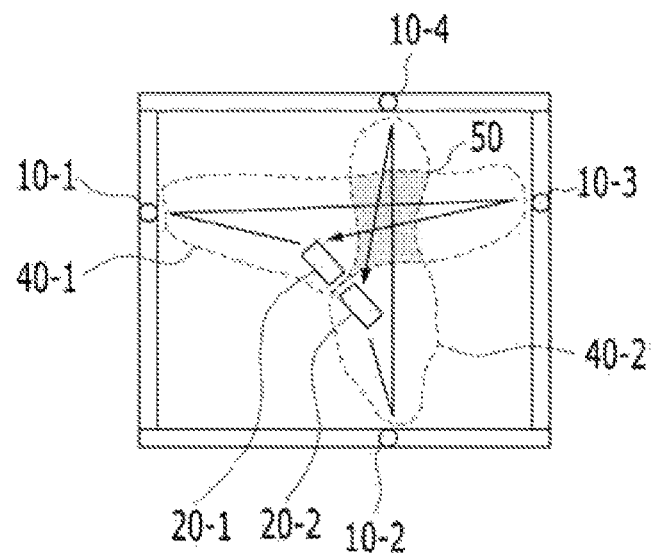
FIG. 6 is a schematic view for describing a process of predicting work areas for each of a plurality of task-performing robots based on predicted plurality of target work trajectories, calculating an area where two or more work areas cross among the predicted work areas for each of the plurality of task-performing robots, and setting a collision risk area based on the crossing area according to an exemplary embodiment of the present disclosure.

FIG. 6 is a schematic view for describing a process of predicting work areas for each of a plurality of task-performing robots based on predicted plurality of target work trajectories, calculating an area where two or more work areas cross among the predicted work areas for each of the plurality of task-performing robots, and setting a collision risk area based on the crossing area according to an exemplary embodiment of the present disclosure.

Referring to FIG. 6, available work points 10-1 to 10-4 may be distributed to the target works by two for each of the plurality of task-performing robots 20-1 and 20-2, and plurality of target work trajectories for each of the plurality of task-performing robots 20-1 and 20-2 may be predicted based on the distributed target work points. Specifically, the first task-performing robot 20-1 may be distributed with a first work point 10-1 and a third work point 10-3 as the target work point, the second task-performing robot 20-2 may be distributed with a second work point 10-2 and a fourth work point 10-4 as the target work point, and the first task-performing robot 20-1 may perform work on a first target work trajectory ("first work point 10-1→third work point 10-3"), and the second task-performing robot 20-2 may perform work on a second target work trajectory ("second work point 10-2→fourth work point 10-4").

In this case, the computing device 100 may move each of the plurality of task-performing robots 20-1 and 20-2 based on the predicted plurality of target work trajectories on a 3D space expressed as voxel, express a space occupied while moving by each of the plurality of task-performing robots 20-1 and 20-2 as volume information, and predict the volume information expressed for each of the plurality of task-performing robots as the work areas 40-1 and 40-2 for each of the plurality of task-performing robots. However, the volume information used for predicting the work areas for each of the plurality of task-performing robots is just an example, and various technologies are used to predict the work areas.

Meanwhile, when target work trajectories are given for each of a plurality of task-performing robots within the same work station, a situation may occur where each of the target work trajectories share the same work area, and in this case, since collisions between robots may occur, the computing device 100 may calculate an area where two or more work areas cross among the predicted work areas 40-1 and 40-2 for each of the plurality of task-performing robots, and set the crossing area as the collision risk area 50. Specifically, the computing device 100 may calculate an area where volume information of two or more task-performing robots crosses among volume information expressed for each of the plurality of task-performing robots, and set the calculated area where the volume information of two or more task-performing robots crosses as the collision risk area. Referring to FIG. 6, "the work area 40-1 of the first task-performing robot 20-1" and 'the work area 40-2 of the second task-performing robot 20-2" have a crossing area. Therefore, when each of the plurality of task-performing robots 20-1 and 20-2 perform the work in the crossing area, there may be a collision between two robots 20-1 and 20-2, so the computing device 100 may set the crossing area as the collision risk area 50. The set collision risk area 50 may be used for determining work orders or work trajectories of the plurality of task-performing robots 20-1 and 20-2. For example, the computing device 100 may generate an interlock signal when there is one of the plurality of task-performing robots in the set collision risk area, and determine the work orders or work trajectories of the plurality of task-performing robots by considering the generated interlock signal, and a specific process thereof will be described below through FIGS. 7 to 8B below.

Figure 7:
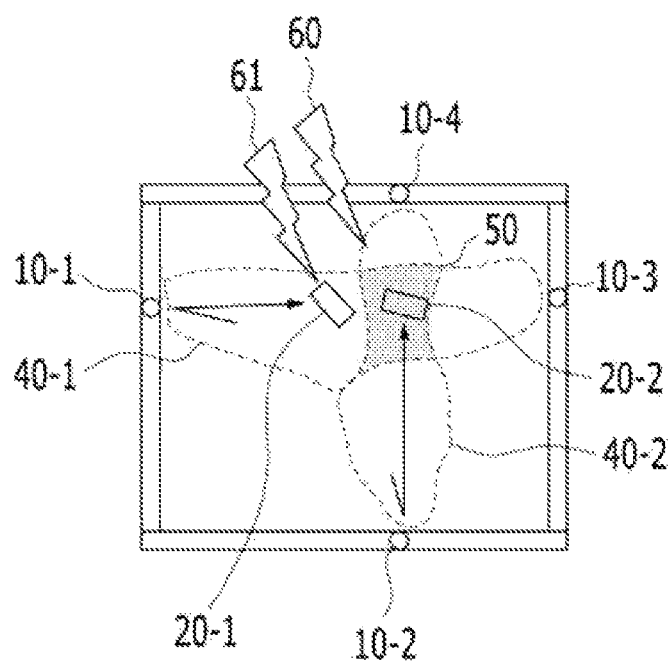
FIG. 7 is a schematic view for describing a process of generating an interlock signal when there is one of the plurality of task-performing robots in the set collision risk area, and determining a work order to prevent other task-performing robots including a collision risk area in which the interlock signal is generated among the plurality of task-performing robots from entering the collision risk area by considering the interlock signal according to an exemplary embodiment of the present disclosure.

FIG. 7 is a schematic view for describing a process of generating an interlock signal when there is one of the plurality of task-performing robots in the set collision risk area, and determining a work order to prevent other task-performing robots including a collision risk area in which the interlock signal is generated among the plurality of task-performing robots from entering the collision risk area by considering the interlock signal according to an exemplary embodiment of the present disclosure.

Referring to FIG. 7, the computing device 100 may generate an interlock signal 60 when there is one (20-2 in FIG. 7) among the plurality of task-performing robots in the set collision risk area 50. In this case, the interlock signal may include a WX signal between two following signals.

OX signal: None of the plurality of task-performing robots exist in the collision risk area 50.

WX signal: The collision risk area 50 is occupied by one of the plurality of task-performing robots.

Therefore, when the WX signal 60 is generated, the computing device 100 may determine a work order to prevent the other task-performing robot 20-1 including the collision risk area between the plurality of task-performing robots 20-1 and 20-2 from entering the collision risk area 50. Specifically, since the collision is expected because the task-performing robot 20-2 is already present in the collision risk area 50 before the other task-performing robot 20-1 enters the collision risk area 50, the other task-performing robot 20-1 may maintain a stop state under the influence 61 of the WX signal until the OX signal is generated. Through this, a collision between plurality of task-performing robots may be prevented when there is a situation in which a work area is shared between robots. Meanwhile, even if the interlock signal is generated, if each task-performing robot in the area performs the work at a completely different time, the work may be performed without any task-performing robot stopping, and in this case, the working hour may be further shortened without collision. Therefore, according to an exemplary embodiment of the present disclosure, the computing device 100 may estimate the influence of the interlock signal and determine the work trajectories of the plurality of task performing robots based on the estimated influence of the interlock signal, and a specific process will be described below through FIGS. 8A and 8B below.

Figure 8A:
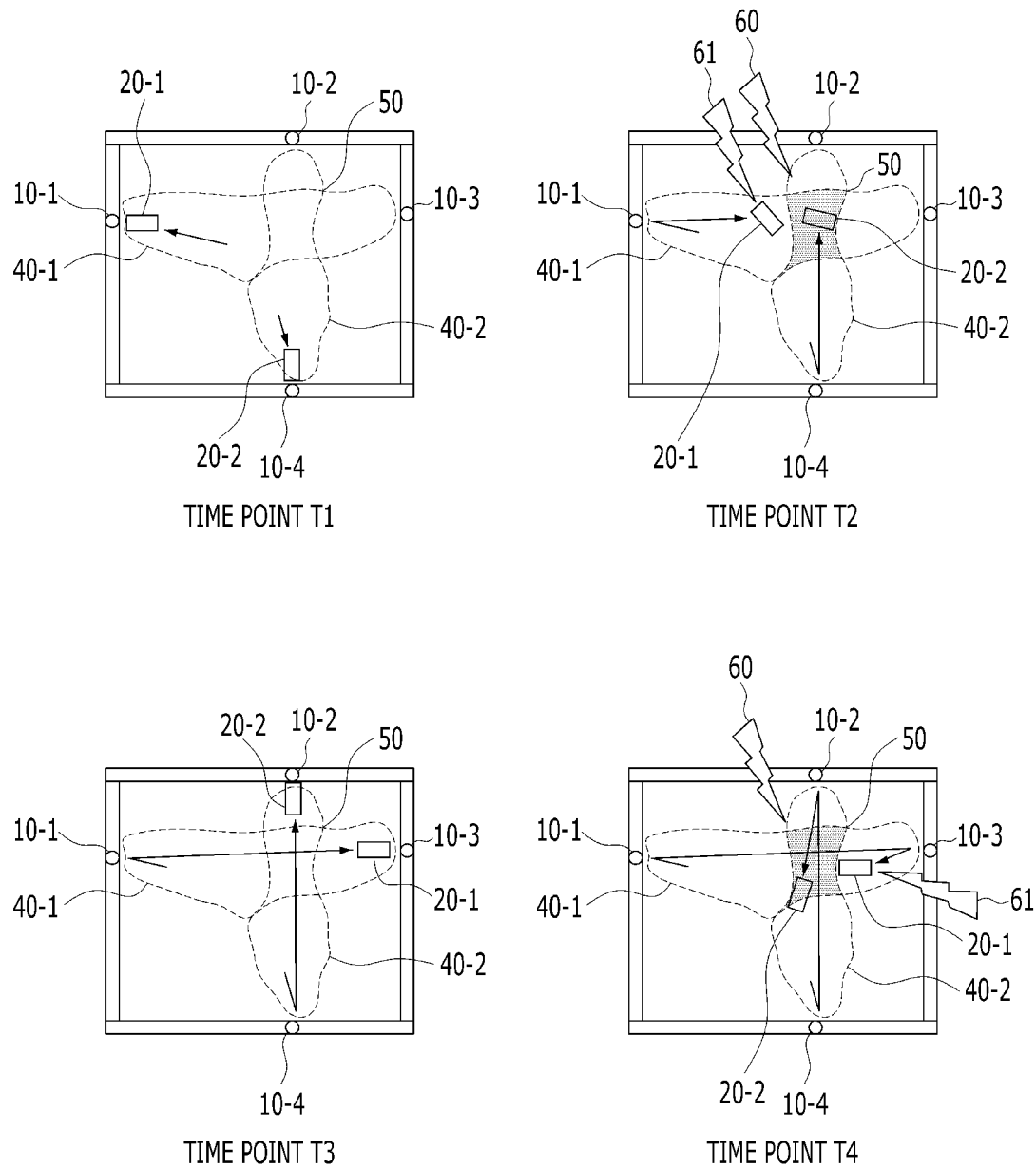
FIGS. 8A and 8B are schematic view illustrating a process of performing a simulation for the plurality of task-performing robots based on predicted plurality of target work trajectories or a changed target work trajectory, estimating an influence of an interlock signal for the simulation, and determining work trajectories of the plurality of task-performing robots based on the estimated influence of the interlock signal according to the exemplary embodiment of the present disclosure.
Figure 8B:
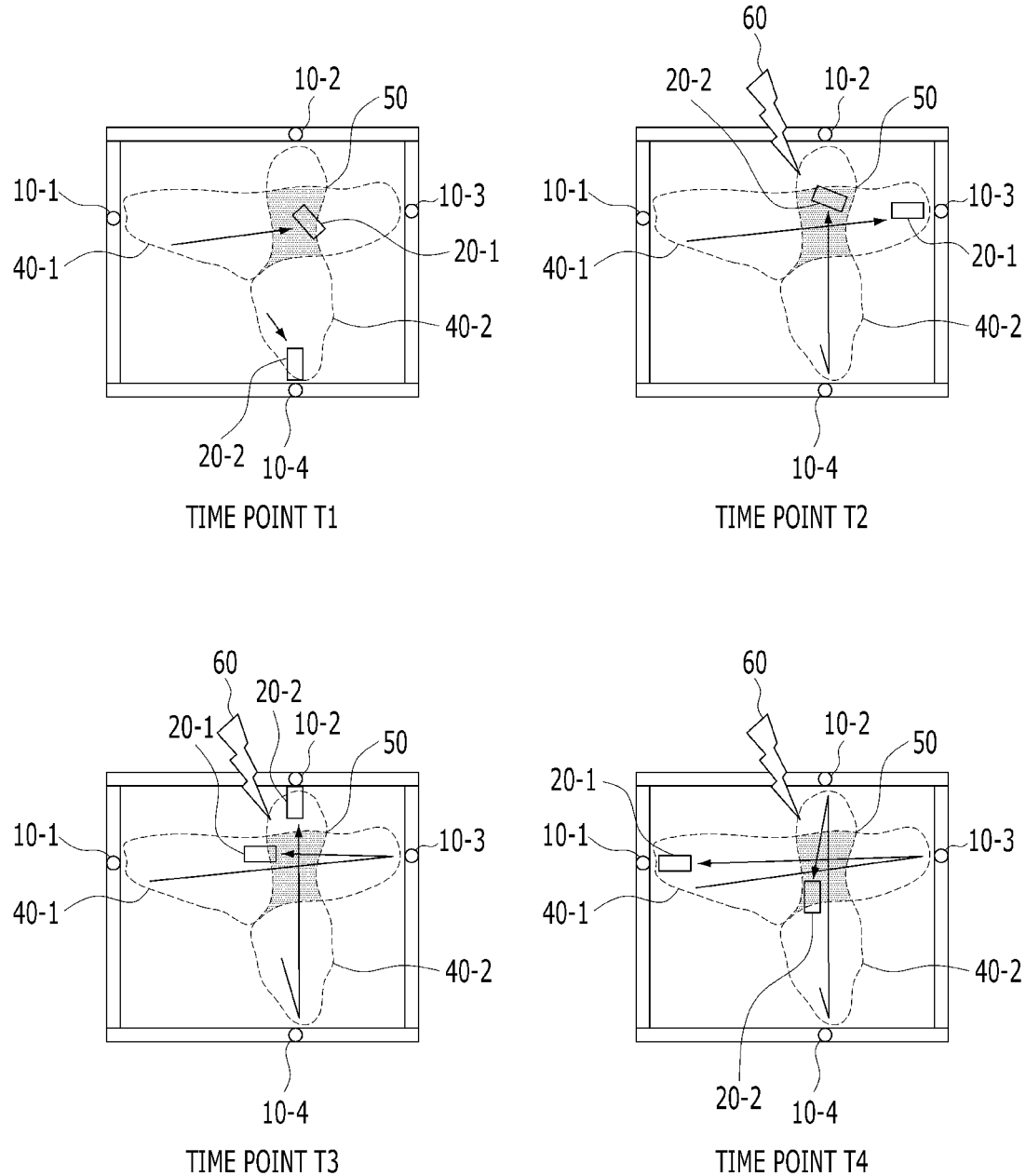

FIGS. 8A and 8B are schematic view illustrating a process of performing a simulation for the plurality of task-performing robots based on predicted plurality of target work trajectories or a changed target work trajectory, estimating an influence of an interlock signal for the simulation, and determining work trajectories of the plurality of task-performing robots based on the estimated influence of the interlock signal according to the exemplary embodiment of the present disclosure.

In this case, the computing device 100 may change the progress direction of a target work trajectory of at least one of the plurality of task-performing robots to the opposite direction. Specifically, all task-performing robots have an initial starting point, start from there, perform a series of tasks, and then return to the original point again. Therefore, if operation performing is completely reversed back, almost the exact same operation may be performed just by reversing the order. For example, in the example of FIG. 5, the computing device 100 may predict shortest distance target work trajectories passing through all target work points 110-1, 110-2, and 110-3 distributed to each of the plurality of task-performing robots (20-1 in the example of FIG. 5) as two trajectories, i.e., a trajectory of working in the order of 110-1→110-2→110-3 and a trajectory of working in the order of 110-3→110-2→110-1. At this time, "the trajectory of working in the order of 110-1→110-2→110-3" and "the trajectory of working in the order of 110-3→110-2→110-1" are only the opposite of the work order, but the distance moved by the task-performing robot 20-1 while performing the work along the trajectories and the working hours may be the same.

Based on this, the computing device 100 may change a progress direction of a target work trajectory of at least one of the plurality of task-performing robots to an opposite direction, perform a simulation for the plurality of task-performing robots based on the predicted plurality of target work trajectories or the changed target work trajectory, estimate an influence of the interlock signal for the simulation. Further, even if the interlock signal is generated, if each task-performing robot in the area performs the work at a completely different time, the computing device 100 may search a combination of the work trajectory which are less affected by the interlock signal so as to perform the work without stopping any task-performing robot. In the present disclosure, the description may be made through comparison of FIGS. 8A and 8B, and (T1, T2, T3, T4) and (T1', T2', T3', T4') illustrated in FIGS. 8A and 8B may be working time points which correspond to each other. In addition, the first task-performing robot 20-1 may be distributed with the first work point 10-1 and the third work point 10-3 as the target work points, and the second task-performing robot 20-2 may be distributed with the second work point 10-2 and the fourth work point 10-4 as the target work points. Additionally, the computing device 100 may set an area where the work area 40-1 of the first task-performing robot 20-1 and the work area 40-2 of the second task-performing robot 20-2 cross as the collision risk area 50.

First, referring to FIG. 8A, the first task-performing robot 20-1 may perform the work on a first target work trajectory ("first work point 10-1→third work point 10-3"), and the second task-performing robot 20-2 may perform the work on a second target work trajectory ("second work point 10-2→fourth work point 10-4").

At the time point of T1, the first task-performing robot 20-1 performs the work for the first work point 10-1, and the second task-performing robot 20-2 performs the work for the second work point 10-2. At this time, since there is nothing in the collision risk area 50, the OX signal is generated, and two task-performing robots 20-1 and 20-2 are not affected in any way.

At the time point of T2, the second task-performing robot 20-2 is present in the collision risk area 50 and the WX signal 60 is thus generated, and the first task-performing robot 20-1 is in a direction of entering the collision risk area 50, so the collision is expected. Therefore, the first task-performing robot 20-1 receives the influence 61 of the WX signal and maintains the stop state until the second task-performing robot 20-2 leaves the collision risk area 50.

At the time point of T3, the first task-performing robot 20-1 is in a state of moving to perform the work for the third work point 10-3, and the second task-performing robot 20-2 performs the work for the fourth work point 10-4. At this time, since there is nothing in the collision risk area 50, the OX signal is generated, and two task-performing robots 20-1 and 20-2 are not affected in any way.

At the time point of T4, the second task-performing robot 20-2 is present in the collision risk area 50 and the WX signal 60 is thus generated, and the first task-performing robot 20-1 which has a delayed working hour due to the stop at the time point T2 is in a direction of entering the collision risk area 50, so the collision is expected. Therefore, the first task-performing robot 20-1 receives the influence 61 of the WX signal and maintains the stop state until the second task-performing robot 20-2 leaves the collision risk area 50.

As a result, in the exemplary embodiment of FIG. 8A, while the work is performed from the time point T1 to the time point T4, the second task-performing robot 20-2 is stopped at two time points T2 and T4, and as a result, the working hour is delayed by a total stop time.

On the contrary referring to FIG. 8B, the first task-performing robot 20-1 may perform the work on a first' target work trajectory ("third work point 10-3→first work point 10-1") in which only the progress direction of the first target work trajectory is the opposite direction, and the second task-performing robot 20-2 may perform the work on the second target work trajectory ("second work point 10-2→fourth work point 10-4") like FIG. 8A.

At a time point of T1', the first task-performing robot 20-1 is in a state of moving to perform the work for the third work point 10-3, and the second task-performing robot 20-2 performs the work for the second work point 10-2. At this time the first task-performing robot 20-1 is present in the collision risk area 50 and the WX signal 60 is thus generated, but the second task-performing robot 20-2 is not in the direction of entering the collision risk area 50, so the collision is not expected, and as a result, the second task-performing robot 20-2 is not affected in any way.

At a time point of T2', the second task-performing robot 20-2 is in a state of moving to perform the work for the fourth work point 10-4, and the first task-performing robot 20-1 performs the work for the third work point 10-3. At this time, the second task-performing robot 20-2 is present in the collision risk area 50 and the WX signal 60 is thus generated, but the first task-performing robot 20-1 is not in the direction of entering the collision risk area 50, so the collision is not expected, and as a result, the first task-performing robot 20-1 is not affected in any way.

At a time point of T3', the first task-performing robot 20-1 is in a state of moving to perform the work for the first work point 10-1, and the second task-performing robot 20-2 performs the work for the fourth work point 10-4. At this time, the first task-performing robot 20-1 is present in the collision risk area 50 and the WX signal 60 is thus generated, but the second task-performing robot 20-2 is not in the direction of entering the collision risk area 50, so the collision is not expected, and as a result, the second task-performing robot 20-2 is not affected in any way.

At the time point of T4', the second task-performing robot 20-2 is in a state of completing the work for the target work points 10-2 and 10-4, and moving to the original point, and the first task-performing robot 20-1 performs the work for the first work point 10-1. At this time, the second task-performing robot 20-2 is present in the collision risk area 50 and the WX signal 60 is thus generated, but the first task-performing robot 20-1 is not in the direction of entering the collision risk area 50, so the collision is not expected, and as a result, the first task-performing robot 20-1 is not affected in any way.

As a result, in the exemplary embodiment of FIG. 8B, neither the first task-performing robot 20-1 nor the second task-performing robot 20-2 is stopped while the task is performed from the time point T1' to the time point T4', and as a result, there is no influence on stopping the task-performing robots 20-1 and 20-2 during the working hour.

Therefore, in FIGS. 8A and 8B, only the work order of the first task-performing robot 20-1 is reversed, but the working hours are different. Through this, according to an exemplary embodiment of the present disclosure, the computing device 100 determines the work trajectories of the plurality of task-performing robots based on the estimated influence of the interlock signal, thereby achieving a technical effect of further shortening the working hour.

Disclosed is a computer readable medium storing the data structure according to an exemplary embodiment of the present disclosure. The data structure may refer to the organization, management, and storage of data that enables efficient access to and modification of data.

The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an availably designed data structure, a computing device can perform operations while using the resources of the computing device to a minimum. Specifically, the computing device can increase the efficiency of operation, read, insert, delete, compare, exchange, and search through the availably designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality ofty of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality ofty of vertices included in the tree. That is, the tree data structure may be a data structure that does not form a loop in the graph data structure.

In the present disclosure, a network function, an artificial neural network, and a neural network may be used to be exchangeable. From here on, it will be described uniformly using neural networks.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include training data input in a neural network training process and/or input data input to a neural network in which training is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality ofty of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network training process and/or a weight in which neural network training is completed. The weight which varies in the neural network training process may include a weight at a time when a training cycle starts and/or a weight that varies during the training cycle. The weight in which the neural network training is completed may include a weight in which the training cycle is completed. Accordingly, the data structure including the weight of the neural network may include a data structure including the weight which varies in the neural network training process and/or the weight in which neural network training is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of training cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 9:
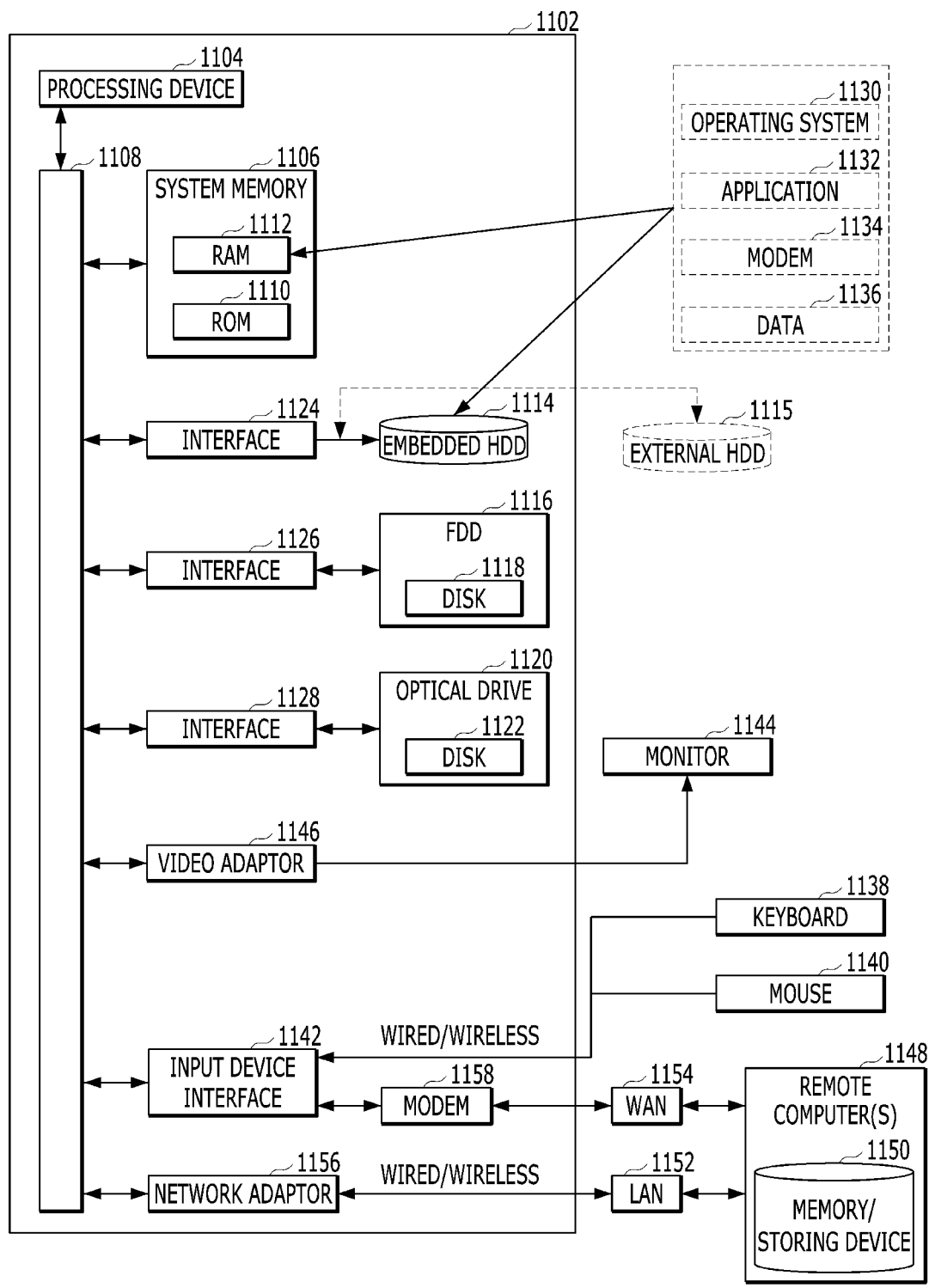
FIG. 9 is a normal and schematic view of an exemplary computing environment in which the exemplary embodiments of the present disclosure may be implemented.

FIG. 9 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them. The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure. Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer (s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method for preventing a collision between a plurality of task-performing robots, the method performed by a computing device, the method comprising:
   determining available work points for each of the plurality of task-performing robots;
   distributing target work points for each of the plurality of task-performing robots based on the determined available work points, and predicting a plurality of target work trajectories for each of the plurality of task-performing robots based on the distributed target work points;
   predicting work areas for each of the plurality of task-performing robots based on the predicted plurality of target work trajectories;
   calculating an area where two or more work areas among the predicted work areas for each of the plurality of task-performing robots cross, and setting a collision risk area based on the crossing area;
   generating an interlock signal when one of the plurality of task-performing robots is in the set collision risk area;
   changing a progress direction of a target work trajectory of at least one of the plurality of task-performing robots to an opposite direction;
   performing a simulation for the plurality of task-performing robots based on the predicted plurality of target work trajectories or the changed target work trajectory, and estimating an influence of the interlock signal for the simulation; and
   determining work trajectories of the plurality of task-performing robots based on the estimated influence of the interlock signal.

2. The method of claim 1, wherein the determining of the available work points for each of the plurality of task-performing robots includes:
   determining the available work points based on at least one of a posture, a position, or an entry of each of the plurality of task-performing robots.

3. The method of claim 1, wherein the target work points mean points at which each of the plurality of task-performing robots actually perform work among the determined available work points.

4. The method of claim 1, wherein the predicting of the plurality of target work trajectories for each of the plurality of task-performing robots based on the distributed target work points includes:
   predicting shortest distance target work trajectories passing through all target work points distributed to each of the plurality of task-performing robots.

5. The method of claim 1, wherein the predicting of the work areas for each of the plurality of task-performing robots based on the predicted plurality of target work trajectories includes:
   moving each of the plurality of task-performing robots based on the predicted plurality of target work trajectories on a 3D space expressed as voxel,
   expressing a space occupied while moving by each of the plurality of task-performing robots as volume information, and
   predicting the volume information expressed for each of the plurality of task-performing robots as the work areas for each of the plurality of task-performing robots.

6. The method of claim 5, wherein the calculating of the area where two or more work areas among the predicted work areas for each of the plurality of task-performing robots cross, and setting of the collision risk area based on the crossing area includes:
   calculating an area where volume information of two or more task-performing robots crosses among volume information expressed for each of the plurality of task-performing robots, and
   setting the calculated area where the volume information of two or more task-performing robots crosses as the collision risk area.

7. The method of claim 1, wherein the determining of the work trajectories of the plurality of task-performing robots based on the estimated influence of the interlock signal includes:

determining work orders to prevent other task-performing robots including the collision risk area in which the interlock signal is generated among the plurality of task-performing robots from entering the collision risk area by considering the interlock signal.

8. A computer program stored in a non-transitory computer-readable storage medium, wherein when the computer program is executed by one or more processors, the computer program allows the one or more processors to perform operations for preventing a collision between a plurality of task-performing robots, the operations comprising:

an operation of determining available work points for each of the plurality of task-performing robots;

an operation of distributing target work points for each of the plurality of task-performing robots based on the determined available work points, and predicting a plurality of target work trajectories for each of the plurality of task-performing robots based on the distributed target work points;

an operation of predicting work areas for each of the plurality of task-performing robots based on the predicted plurality of target work trajectories;

an operation of calculating an area where two or more work areas among the predicted work areas for each of the plurality of task-performing robots cross, and setting a collision risk area based on the crossing area;

an operation of generating an interlock signal when one of the plurality of task-performing robots is in the set collision risk area;

an operation of changing a progress direction of a target work trajectory of at least one of the plurality of task-performing robots to an opposite direction;

an operation of performing a simulation for the plurality of task-performing robots based on the predicted plurality of target work trajectories or the changed target work trajectory, and estimating an influence of the interlock signal for the simulation; and an operation of determining work trajectories of the plurality of task-performing robots based on the estimated influence of the interlock signal.

9. A computing device comprising:
at least one processor; and
a memory,
wherein the at least one processor is configured to
determine available work points for each of a plurality of task-performing robots, distribute target work points for each of the plurality of task-performing robots based on the determined available work points, and predict a plurality of target work trajectories for each of the plurality of task-performing robots based on the distributed target work points, predict work areas for each of the plurality of task-performing robots based on the predicted plurality of target work trajectories, calculate an area where two or more work areas among the predicted work areas for each of the plurality of task-performing robots cross, and set a collision risk area based on the crossing area, generate an interlock signal when one of the plurality of task-performing robots in the set collision risk area, change a progress direction of a target work trajectory of at least one of the plurality of task-performing robots to an opposite direction, perform a simulation for the plurality of task-performing robots based on the predicted plurality of target work trajectories or the changed target work trajectory, and estimate an influence of the interlock signal for the simulation, and determine work trajectories of the plurality of task-performing robots based on the estimated influence of the interlock signal.

\* \* \* \* \*